Patented Sept. 1, 1931

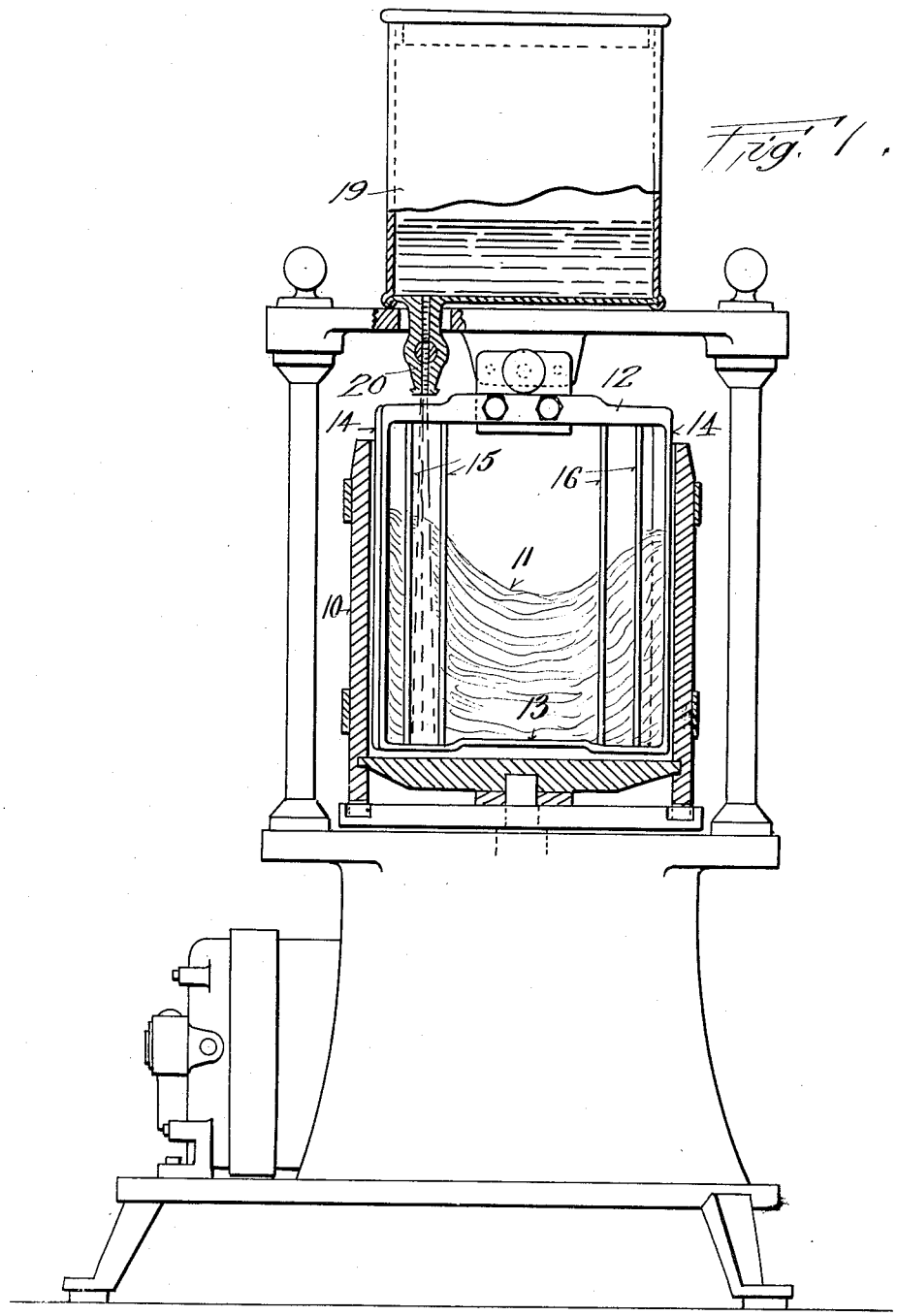

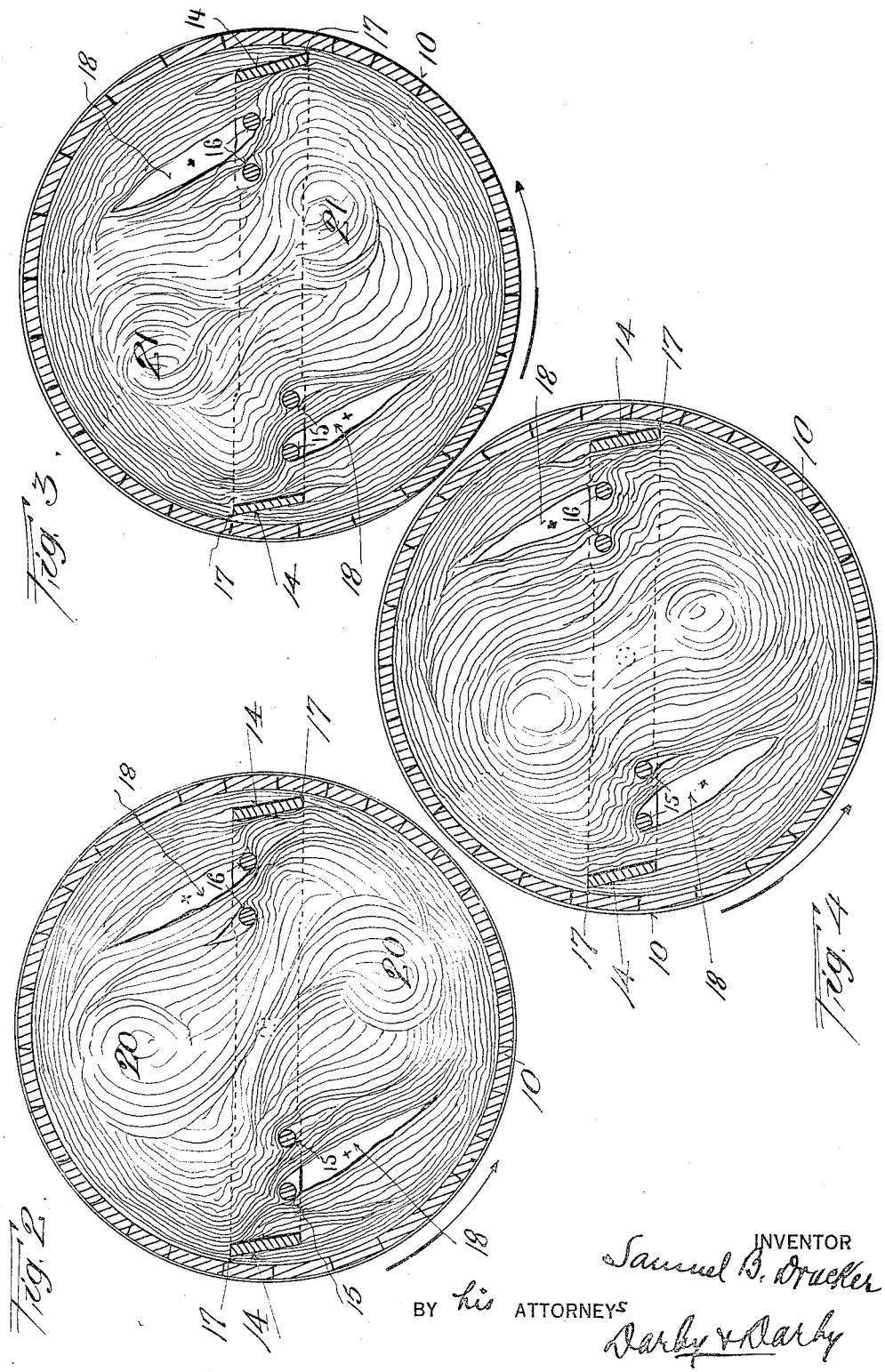

1,820,909

UNITED STATES PATENT OFFICE

SAMUEL B. DRUCKER, OF BROOKLYN, NEW YORK

METHOD OF MAKING MAYONNAISE

Application filed April 8, 1922, Serial No. 550,681. Renewed December 10, 1926.

This invention relates to the method of making mayonnaise.

The object of the invention is to provide a method of making mayonnaise wherein standard and uniform quality of product is attained.

A further object of the invention is to effect a thorough emulsification, particularly of the oil content, in the manufacture of mayonnaise.

Other objects of the invention will appear more fully hereinafter.

The invention consists substantially in the mode of operation, as will be more fully hereinafter described as illustrated in the accompanying drawings, and finally pointed out in the appended claims.

Referring to the accompanying drawings,—

Fig. 1 is a view in elevation, partly in vertical section, showing one form of apparatus suitable for use in carrying out my invention.

Fig. 2 is a view in horizontal section through a container and illustrating the action at an initial stage of the operation.

Fig. 3 is a view similar to Fig. 2, showing the action at a later stage of the operation.

Fig. 4 is a similar view showing the action at or near the stage of completion of the operation.

While I have shown one form of apparatus suitable for carrying my invention into operation, it is to be understood that my invention is independent of any particular form of apparatus employed in carrying it out, and may be carried out in practice in a wide variety of specifically different forms of apparatus.

In the manufacture of mayonnaise for the market or for use, and particularly where oil is employed as one of the essential ingredients, difficulty has heretofore been experienced in effecting a thorough emulsification of the constituents employed, with the result that some one or more of the ingredients, after a short lapse of time, will begin to separate out from the mass. Even where such separation is not marked, the failure to thoroughly emulsify the constituents results in an inferior product with a more or less pronounced taste of the oil constituent of the mass. Moreover, the failure to thoroughly admix and emulsify the constituents and in their proper relative proportions, is liable to render the product more or less rough and of an undesirable color.

This failure to properly and thoroughly emulsify is due to the fact that in the processes heretofore employed the globules and molecules of the oil ingredient have not been broken up and crushed sufficiently to enable the emulsifying action to be satisfactorily accomplished. In ordinary stirring or heating operations instead of breaking up and crushing the oil particles, they are, for the greater part, merely caused to travel around in the stirred or beaten mass and hence the oil fails to become amalgamated into the mass to produce a homogeneous body in the final product, but, rather, tends to separate out from the body and to impart the taste of oil to such product, and to have an undesirable roughness and color, as above stated.

It is among the special purposes of my present invention, in the manufacture of mayonnaise, to avoid these and other objections frequently encountered in such manufacture, and to provide a delicious, smooth, thoroughly mixed and emulsified product, which is relieved of any objectionable pronounced taste of the oil content and is uniform in quality where the same ingredients are employed in the same relative proportions thereof, and which is of delicious taste and desirable color and aroma.

In carrying out my invention I prefer to employ as ingredients fresh eggs, salt, pepper, mustard, sugar, vinegar, and a suitable oil. I do not desire, however, to be limited to the use of these specific ingredients as other ingredients may be added to impart any desired color or taste to suit the individual desires. Ordinarily, however, with the ingredients above mentioned, a most delicious and desirable mayonnaise product is obtained. The relative proportions of the ingredients may likewise be varied throughout a wide range to suit the individual taste and desire of the maker. I have found, however, by way of example, in making up a two gallon batch of mayonnaise product that the following relative proportions of ingredients are suitable, namely, five quarts, more or less, of oil, such as olive oil, cotton seed oil, or the like; one and one-half of a pint, more or less, of vinegar; ten eggs; two ounces of mustard; four ounces of sugar; four ounces of salt; one teaspoonful of pepper. As above indicated, however, these relative proportions may be varied throughout a wide range, and other ingredients may be added for flavoring, coloring, or the like.

The eggs are first broken into a suitable container and are more or less broken up or beaten. The mustard, salt, sugar and pepper, are then mixed together and added to the broken up or beaten eggs, and the mass thoroughly stirred to effect a mixture of these ingredients. The oil is then added and finally the vinegar. I have discovered that the manner of supplying the oil content plays a vitally important part in the production of a thoroughly emulsified and desirable product, and, in accordance with my discovery, I propose to supply the oil in small amounts, and preferably to a point at the approximate lower part of the mass to which the oil is to be added. To accomplish this, I impart a whirling centrifugal movement to the mass which is to receive the oil, and I interpose in the path of the whirling mass one or more suitable obstructions which causes the whirling mass in passing by the same to produce in the body thereof a void or space immediately behind the obstruction, and I cause the oil to drip or flow in a small stream into this void or space, positioning the source of the oil above the whirling mass and in position for the drip or drain therefrom to fall into such void or space, thereby reaching the lowermost portion or bottom of the whirling mass. The obstruction or obstructions interposed in the path of the whirling mass not only cause the voids or spaces referred to, but also break up the mass into streams as the mass passes such obstructions, which streams are deflected by the obstructions apart from each other to be reunited under the influence of the swirling centrifugal movements of the mass after passing the obstructions. By thus interposing a plurality of such obstructions in the path of the swirling mass I am enabled to thoroughly break up the mass and to separate the same into streams and whirls which separate from each other at the point where the obstructions are encountered, only to be reunited again after passing such obstructions. In this manner the oil content is thoroughly crushed or broken up and then mixed or caused to be taken up into the mass and a thorough emulsification of the mass is effected, and I effect a thorough and complete distribution of the crushed or broken up particles of the oil content throughout the mass, a result which is difficult, if not impossible to obtain, in the ordinary beater operation generally employed in the manufacture of mayonnaise. In other words, instead of employing a rotary agitator which exerts a more or less beating action upon the mass or batch, and which does not crush or break up the oil particles, I effect a crushing or breaking up of the oil particles, thereby enabling the oil to be thoroughly taken up into the mass to produce a smooth homogeneous body. In the accomplishment of this result, in one mode of carrying out my invention, I impart a whirling and centrifugal movement to the mass itself, and simply interpose at suitable points in the path of the swirling mass suitable fixed or stationary obstructions to break up the mass and effect a thorough and complete mixture of the contents thereof, and secure a thorough emulsification. This result is contributed to by the production in the mass of interweaving cross currents which exert a more or less grinding or crushing action on the oil particles as well as securing a thorough incorporation of all the particles of all the ingredients into and their distribution throughout the mass.

After the oil content has been supplied to the whirling mass the vinegar ingredient is then added in like manner in comparatively small quantities at a time while continuing the swirling and centrifugal motion of the mass, and, in like manner, I prefer to supply the vinegar ingredient into the voids or spaces formed in the swirling mass by fixed obstructions placed in the path of movement thereof so as to effect a thorough distribution of the vinegar ingredient and enable it to perform its chemical and other action throughout the entire mass of the batch.

Various forms of mechanism may be employed in carrying out my process. I have illustrated one convenient arrangement which I have found satisfactory and efficient, and wherein the swirling centrifugal and the interweaving cross current action imparted to the mass or batter is accomplished by axially rotating a suitable container 10 in which the batter 11 is contained. By axially revolving the container the mass 11 partakes of the revolving movements of the container, and hence a swirling movement under the influence of centrifugal force is imparted to the mass. Various means may be employed for interposing a fixed or stationary obstruction or obstructions in the path of the swirling mass. A simple arrangement is shown wherein a frame of generally rectangular shape is employed consisting of the upper and lower members 12, 13, which are connected together by the side portions 14 and by intermediate rods 15, 16, said frame being suitably held stationary with reference to and positioned within the container 10. In practice I prefer that the stationary frame shall extend diametrically across the container 10, and to form the side members 14 thereof in slightly inclined relation so as to enable their edges 17, toward which the swirling mass approaches, to lie closer to the interior surface of the container 10 than any other part of said stationary frame. I also prefer to employ two sets of obstructing members 15, 16, disposed at opposite sides of the center of the stationary frame, and preferably at the far edges of said frame with reference to the direction of swirling travel of the mass, and to separate somewhat apart the members of each set of said obstructions. With an axial rotation imparted to the container in the direction indicated by the arrows, the batter contained therein is carried in like direction. On encountering the side portions 14 of the stationary portion, and particularly the edges 17 thereof, that portion of the batter which is in contact with, or in proximity to the inner wall of the container, and which is moving at the same rate of speed as that of the container, is scraped off and deflected inwardly from the inner surface of the container to an extent permitted by the clearance between said edges 17 and the inner wall of the container 10. At the same time the speed of whirling motion of the batter at these points is retarded by the obstruction afforded by the side portions 14 of the stationary member. By reason of this, and of the inclined position of the side members 14, the mass is divided by said side portions 14 into streams, one passing on one side and the other on the other side of said side portions, these streams reuniting after passing beyond the stationary frame. In like manner the obstructions 15 produce divided streams in the whirling mass, and also exert a more or less retarding action on the speed of the whirl thereof, said streams passing on opposite sides of the obstructing members 15, and these streams again reunite after passing said obstructions. It will be observed that by reason of the retardation of the speed of travel of the mass caused by the stationary obstructions, one stream into which the mass is divided is directed towards the center of the container, and toward a region where the speed is less than that of the other stream which is directed toward the internal wall of the container. After passing the obstructions the mass again partakes of the centrifugal force, due to the revolution of the container, and tends to move outwardly towards the inner surface of the container and to increase its retarded speed by reason of such outward or radial progression or movement thereof. It is this peculiar action which it is the purpose of my invention to achieve and which results in breaking up or crushing the oil particles or molecules, and in securing the desired thorough admixture and emulsifying action. Moreover, a void or space is formed in the mass immediately in the rear of each of the obstructions as indicated for example at 18, the extent of which depends upon the speed at which the mass is being whirled, and the size and shape of the obstruction it encounters. This void or space extends throughout the depth of the swirling mass, and, in accordance with my invention I propose to supply the oil and vinegar constituents into one or more of these voids or spaces, so that the said ingredients may reach the bottom or lower region of the mass before becoming incorporated into the swirling mass. To accomplish this result a container 19 for the oil or vinegar is positioned above the container 10, and is provided in its bottom with a suitable valve controlled spigot 20 which is positioned immediately over or above a void or space 18 in the swirling mass, so that by opening the spigot the oil or vinegar ingredients may drip or flow more or less slowly into the void or space 18 immediately below said spigot.

The whirling action and interweaving cross stream effects produced are not only distinctive, but vary in characteristics as the emulsifying action progresses, and as the mass of batter increases with the continued supply of the oil content and also with the supply of the vinegar content as the latter performs its function in the emulsifying action. In the early stages of the operation distinct whorls of considerable area are formed at diametrically opposite points in the container 10, as indicated at 20 in Fig. 2. These whorls or whirl-pools, so to speak, are due to the reactions of the movements of the mass resulting from the retarding effects of the fixed or stationary obstructions and the stream effects produced thereby with resulting retardation of the speeds of whirling movement of the separated streams of material. As the action continues, and the emulsification progresses, the whorls or whirl-pools become somewhat more condensed as indicated at 21, see Fig. 3, and as the vinegar content is supplied and begins to effect its action in the batter, a smoothing of the batter is at once noted with apparently a more steady and uniform boiling or whirlpooling action of the mass, and this takes place as indicated in Fig. 4 of the drawings. A comparatively short duration of time is required to complete the action. Approximately twenty minutes is sufficient, and the resulting batch is ready to be packaged for use or shipment. In the drawings, the container 10 is composed of wood, preferably made of slats as customarily employed in the making of barrels. Wood is also used for the bottom thereof. This construction is further shown in my companion case, S. N. 550,682, filed April 8, 1922, also showing the conventional illustration for wood.

Though the process previously described may be carried out in various forms of mechanism, I have found that the process tending towards thorough and complete emulsification or dissemination of the ingredients is enhanced and augmented where the swirling and centrifugal action imparted to the mass or batter by reason of axially rotating the container holding the same is carried out in the presence of a receptacle whose side walls and bottom are made of wood. The relative movement of the wooden walls and the batter, particularly where the batter is caused to be further whirled or moved in interweaving cross currents, as above characterized, tends to more perfectly distribute, uniformly disseminate or emulsify the ingredients which enter into and make up the batter or batch.

While I am not prepared to exactly explain the nature of the action when relative movement of the batch or batter is obtained between itself and that of the wooden walls of the container, the dissemination, amalgamation or emulsification is more thorough under such conditions.

I do not claim herein the structure of the apparatus shown and described as such subject-matter will be claimed in a separate application as a division herefrom.

Having now set forth the objects and nature of my invention, and the manner of carrying the same into practice, what I claim as new and useful and of my own invention, and desire to secure by Letters Patent is,—

1. In the manufacture of mayonnaise, the process which consists in mixing together a portion of the ingredients to form a batch, then adding an oil ingredient to the batch and crushing and breaking up the particles of the oil ingredient and thoroughly distributing the same uniformly throughout the mass of the batch whereby to amalgamate the same into such batch to effect thorough emulsification thereof.

2. In the manufacture of mayonnaise, the process which consists in mixing together a portion of the ingredients to form a batch, then producing whirling, interweaving cross currents in the body of the batch and simultaneously adding an oil ingredient whereby to crush and break up the particles of the oil ingredient and to distribute the same uniformly throughout the said body to effect thorough emulsification thereof, and then adding an acid ingredient to complete amalgamation.

3. In the manufacture of mayonnaise, the process which consists in mixing together mayonnaise forming ingredients to form a batch, then producing whirling, interweaving cross currents in the body of the batch and simultaneously adding an oil ingredient whereby to crush and break up the particles of the oil ingredient and to distribute the same uniformly throughout the said body to effect thorough emulsification thereof.

4. In the manufacture of mayonnaise, the process which consists in mixing together a portion of the ingredients to form a batch, then producing whirling, interweaving cross currents in the body of the batch and simultaneously adding an oil ingredient in relatively small increments at the bottom portion of the body of the batch, whereby the particles of oil ingredient are crushed and broken up and are uniformly distributed throughout and taken up into said body to form a thoroughly emulsified mass.

5. In the manufacture of mayonnaise, the process which comprises imparting a rotary whirl to a mixture of a portion of the ingredients of a mayonnaise batch, the whirling of the ingredients being relative to the surfaces of wood, interposing an obstruction in the path of the whirling mass to form voids and cross currents and supplying another ingredient in the voids formed, the last added ingredients serving to move over the wooden surface by the rotary action imparted to the mixture.

6. In the manufacture of mayonnaise, the process which comprises mixing together a portion of the ingredients to form a batch, then whirling the mass by peripheral rotation and causing the batch to move relative to wooden surfaces and then adding an oil ingredient to the batch adjacent the bottom thereof for movement radially to the periphery of the batch whereby the oil may be thoroughly and uniformly distributed throughout the mass of the batch in crushed or broken particles by relative movement of the ingredients over the surfaces of wood.

7. In the manufacture of mayonnaise, the process which comprises continuously causing the ingredients forming the batch to pass relative to exposed surfaces of wood by peripheral movement of the wooden surfaces while forming interweaving cross currents in the body of the batch caused by stationary obstructions.

In testimony whereof I have hereunto set my hand on this sixth day of April, A. D. 1922.

SAMUEL B. DRUCKER.